United States Patent Office 3,054,885
Patented Sept. 18, 1962

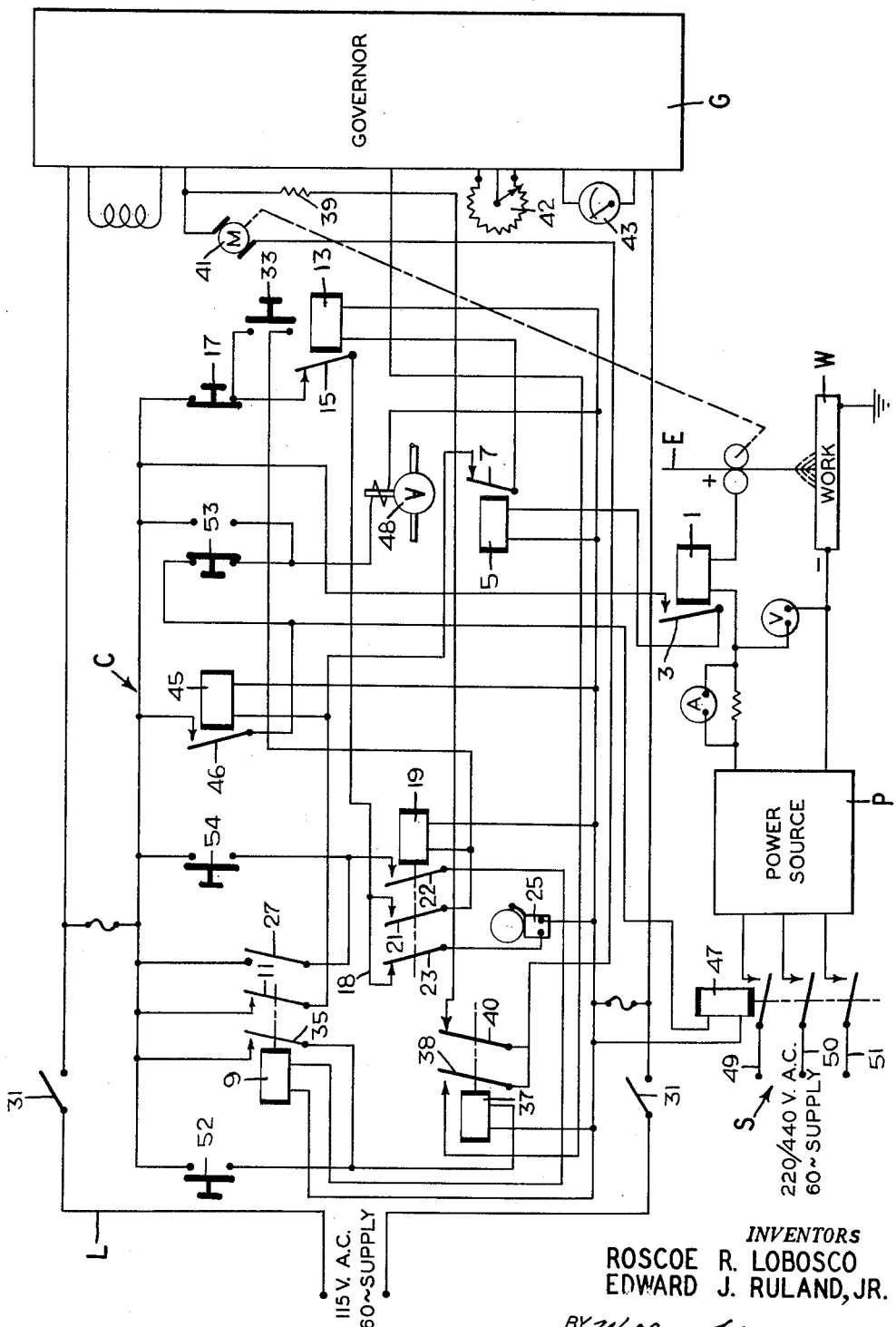

3,054,885
AUTOMATIC WELDING CONTROL
Roscoe R. Lobosco, Fanwood, and Edward J. Ruland, Jr., West Caldwell, N.J., assignors to Union Carbide Corporation, a corporation of New York
Filed Mar. 31, 1960, Ser. No. 19,087
10 Claims. (Cl. 219—131)

This invention relates to arc control systems; and more particularly to an arc system for controlling the feed of a wire electrode to the welding arc zone in a consumable electrode welding process.

In production line welding it is not unusual for two or more welding machines to be in operation at the same time. Serious problems can arise under such circumstances especially when a consumable wire electrode welding process is utilized. For example, heretofore, if a failure to initiate the welding arc occurred in consumable electrode welding or if the arc was lost for any reason in the course of making a weld, the consumable electrode continued to feed toward the work-piece. As a consequence, unconsumed welding wire would entangle itself on the surrounding equipment, ultimately causing the malfunctioning of the entire apparatus. If the wire was electrically hot, as it usually is, it could arc to parts of the machine and thus damage it. Therefore, it was of paramount importance to have the operator remain within the welding area and to observe the operation of all machines so as to shut off the power in the event of such an occurrance. The economics inherent to this type of operation could result in an unprofitable venture. On the other hand, if the machine is left unattended the amount of lost wire and shielding gas, if used, and the possible damage to equipment and spoilage of work pieces could result in a considerable loss.

The inventive control system makes it possible for one operator to tend to a battery of machines without having to waste valuable time within the welding area of one machine and thus results in considerable savings by alleviating excess expense.

In many cases the battery of machines may be started and stopped simultaneously. In such case it would be practically impossible for the operator to observe all machines simultaneously. The invention makes this unnecessary.

Accordingly, it is a main object of the invention to provide a control system including circuitry for locking out the control in the event an arc is not struck within a predetermined interval of time or in the event that the arc is lost.

Another object is to provide an alarm circuit for indicating the absence of an arc.

An additional object is to provide a lock-out circuit for de-energizing the wire feed circuit and the arc-energizing circuit in the absence of an arc.

Yet another object is to provide circuitry for inching the welding wire and to obtain normal gas flow, even though the welding functions of the control are locked out. Other advantages and objects will be pointed out or become apparent from the description and drawings found herein.

In the arc control system according to the invention there is provided a circuit having means for automatically locking out the control system in the absence of a welding arc and also having an alarm means such as a buzzer or light for indicating the absence of such arc. Another circuit is provided in the system, such circuit having a push button means for closing such circuit to the wire feed motor thereby permitting the inching of welding wire even though the remainder of the control is locked out.

For a more complete understanding of the invention, reference should be made to the following detailed description and drawing in which the single FIGURE is a wiring diagram of the invention. In the embodiment of the invention shown in the drawing and described hereinafter, reference is made to a gas-shielded consumable electrode welding process control. It is to be understood that the inventive control may be utilized for other consumable electrode welding processes and that the invention should in no way be limited by the specific description.

Referring to the drawing, the control C is connected in circuit relation with a governor G, a power source P, a consumable electrode E and a workpiece W. The control C operates off of a 115 volts A.C. 60 cycle line L. The power source is connected to a 220/440 volt A.C. 60 cycle line S.

The unique automatic lock out feature of the control is obtained by connecting a welding current relay 1 in the circuit from the power source P to the wire electrode E. Contact 3 of relay 1 is in a circuit from one side of the line L through an auxiliary welding current relay 5 to the other side of the line L. Normally closed contact 7 of relay 5 is in a circuit made from one side of line L through normally open contacts 11 of weld start relay 9 to the other side of line L through no arc time delay relay 13. Normally closed contact 15 of relay 13 is in a circuit completed from one side of line L through emergency stop push button 17 through a parallel branch 18 to the other side of line L. One leg of such parallel branch contains normally open contact 21 of lock out relay 19 and lock out relay 19 itself. The other leg of such parallel branch contains normally closed contact 23 of relay 19 and a no arc warning alarm 25.

A third set of contacts 22 associated with lock out relay 19 are in a circuit made from one side of line L, through an external start means 27 to contacts 22 through weld start relay 9 to the other side of line L.

In operation, if the welding arc does not initiate or is extinguished for some reason, welding current relay 1 deenergizes; contact 3 opens; auxiliary welding current relay 5 deenergizes; normally closed contact 7 re-closes; no arc time delay relay 13 is energized; after a predetermined time normally closed contact 15 opens; lock out relay 19 deenergizes opening contacts 21 and 22 and re-closing contact 23. The opening of contact 22 deenergizes weld start relay 9 which in turn causes contact 11 to open deenergizing no arc time delay relay 13. As a result contact 15 of relay 13 re-closes making the circuit to no arc welding alarm 25 which is energized alerting the welding operator to the absence of a welding arc. Thereafter the control is "locked out" and does not function until the unlock push button 33 is actuated in order to energize the lock out relay 19.

In normal operation, that is when the arc is initiated and is not lost during the weld, the operation of the control is as follows. The control C is connected to the governor G by means of double pole single throw switch 31. The lock out relay 19 is energized by closing unlock push button 33 which causes contacts 21 and 22 to close and contact 23 to open. When the weld is ready to be made external start means 27 is closed. This instantaneously energizes weld start relay 9. Normally open contact 35 of relay 9 close thereby energizing wire feed relay 37. Normally open contact 38 closes making the circuit to wire feed motor M. Normally closed contact 40 opens disconnecting the dynamic braking resistor 39 from across the motor M. The wire feed motor armature 41 starts to rotate and welding wire is fed toward the work W at a speed determined by the setting of welding current potentiometer 42 and is indicated by speed indicator 43.

Once contact 11 of weld start relay 9 closes, anti-stick time delay 45 and no arc time delay 13 are energized. No arc time delay 13 is a pneumatic time delay relay that can be varied by means of an adjustment screw.

Such adjustment is dependent upon the speed at which the welding wire is feeding and establishes an arc between such wire and work. Normally open contact 46 of relay 45 closes, welding contactor 47 and if, used, gas solenoid valve 48 are energized. Contactor 47 closes contacts 49, 50, 51 energizing the power source P. Gas solenoid valve 48 opens permitting a flow of shielding gas to the arc zone.

Welding wire feeds down until it contacts the workpiece and burns back to initiate an arc. Once welding current flows, the welding current relay 1 is energized and normally open contact 3 of relay 1 closes to energize the auxiliary welding current relay 5. Normally closed contact 7 of relay 5 is opened and the no-arc time delay 13 is prevented from completing its timing cycle. Thus, normally closed contact 15 of no-arc time relay 13 remains closed and the lock-out relay 19 will not deenergize. Welding proceeds until the external start and stop means 27 is opened to de-energize the weld start relay 9. Subsequently contact 35 of relay 9 opens and the wire feed relay 37 is de-energized. Then contact 38 of relay 37 disconnects the wire feed motor armature 41 from the armature circuit and the braking resistor 39 is connected across the armature 41 by means of contact 40 of relay 37.

The anti-stick time delay 45 is de-energized when contacts 11 of relay 9 are open. Contact 46 of anti-stick time delay 45 remains closed for a brief period after the anti-stick time delay 45 is de-energized so that welding contactor 47 and gas solenoid valve 48 remain energized for a time as determined by its setting. This permits the welding wire to burn free from the puddle at the end of the time period. Contact 46 of anti-stick time delay 45 then opens, welding contactor 47 and gas solenoid valve 48 are de-energized. The anti-stick time delay 45 is a pneumatic time delay relay, and is simply adjusted by means of a small knob on the front of the timer. As soon as the anti-stick time delay 45 is de-energized, contact 46 of anti-stick time delay 45 remains closed for a selected period of time. It is important to realize that too short a time causes the wire to freeze in the puddle, and too long a time may result in a burnback. Consequently, the setting of the anti-stick time delay 45 in conjunction with the size of welding wire and the amount of welding current used determines the proper setting of this timer.

When the welding current ceases to flow, welding current relay 1 is deenergized and contact 3 of relay 1 opens; thereafter, auxiliary welding current relay 5 is de-energized. Then contact 7 of auxiliary welding current relay 5 closes and the control is ready for recycling.

The control of the invention may be used in a multiple arc system. In such system, each welding machine would have its own control as shown in the drawing. The only interconnection would be that an external start means 27 would be a multiple switch which would instantaneously energize the weld start relay 9 in each of the controls.

Another feature of the invention is that even though the control is "locked-out," the wire feed motor M still can be operated by simply actuating the inch-down pushbutton 52 and in a similar manner the gas flow can be checked by actuating the gas purge pushbutton 53.

Employing the circuit of the invention, an individual control can be made to function on a welding cycle by means of a normally open weld test pushbutton 54 placed in parallel with the weld starting and stopping means 27. As long as the weld test pushbutton 54 is actuated the control will function. It is obvious that such an optional arrangement lends itself to the "checking out" of an individual machine without necessitating the initiation of a welding cycle for the entire bank of welding units.

While the invention has been described in detail with reference to the single preferred embodiment shown in the drawing it is to be understood that the inventive concept is in no way to be limited thereby except as defined and limited by the appended claims.

What is claimed is:

1. A consumable wire electrode arc system, said system including wire feed means for feeding said consumable wire electrode from a source of such wire to a workpiece; in combination with a control circuit including a wire feed circuit for actuating said wire feed means, an arc energizing circuit for initiating an arc between said wire electrode and said workpiece and a lock-out circuit provided with means for automatically deenergizing said wire feed circuit in the absence of an arc said lock-out circuit including a first relay means responsive to the flow of arc current between said wire electrode and said workpiece; a second relay means activated by said first relay means when there is an absence of arc current; a lock-out relay functioning in response to said second relay means to automatically deenergize said wire feed circuit.

2. A consumable wire electrode arc system, said system including wire feed means for feeding said consumable wire electrode from a source of such wire to a workpiece; in combination with a control circuit including a wire feed circuit for actuating said wire feed means, an arc energizing circuit for initiating an arc between said wire electrode and said workpiece, a lock-out circuit provided with means for automatically deenergizing said wire feed circuit and deenergizing the arc energizing circuit in the absence of an arc.

3. In a consumable wire electrode arc system the combination with wire feed means for passing said consumable wire electrode from a source of such wire to a workpiece; of a control circuit provided with a wire feed circuit for actuating said wire feed means, an arc energizing circuit for initiating an arc between said wire electrode and said workpiece, a lock-out circuit provided with means for automatically deenergizing said wire feed circuit in the absence of an arc said lock-out circuit including a first relay means responsive to the flow of arc current between said wire electrode and said workpiece; a second relay means activated by said first relay means when there is an absence of arc current; a lock-out relay functioning in response to said second relay means to automatically deenergize said wire feed circuit, and an alarm circuit provided with means for indicating such absence of an arc.

4. A consumable wire electrode welding arc system, said system including wire feed means for feeding a consumable welding wire electrode from a source of such wire to a workpiece to be welded; in combination with a wire feed circuit for actuating said wire feed means to feed said welding wire electrode at welding speed, a welding arc energizing circuit for initiating a welding arc between said wire electrode and workpiece to be welded, a lock-out circuit provided with means for automatically deenergizing said wire feed circuit and welding arc energizing circuit in the absence of a welding arc, an alarm circuit provided with means for indicating such absence of a welding arc, and a wire "inch" circuit for actuating said wire feed means at "inching" speed without energizing the welding arc circuit.

5. In a consumable wire electrode welding arc system the combination with two or more wire feed means for feeding consumable welding wire electrodes to work to be welded; of arc energizing circuits for initiating a welding arc between such consumable electrodes and one or more workpieces, a lock-out circuit for automatically deenergizing any of said welding wire feed means in the absence of a welding arc between the wire electrode being fed thereby and the work without affecting welding operation of the remaining wire feed means.

6. A welding arc system including two or more welding torches having associated therewith wire feed means for feeding consumable welding wire electrode to one or more workpieces to be welded, in combination with arc energizing circuits for energizing a welding arc between such wire electrodes and one or more of such workpieces, a lock-out circuit for automatically deenergizing the welding wire feed means and the arc energizing circuits of any of said welding torches which fails to establish or loses an arc without affecting the performance of the remaining torches.

7. A gas shielded arc welding system for a welding torch; said torch having associated therewith wire feed means for passing a consumable wire electrode from a source of such wire through said torch and means for discharging arc shielding gas around the end of such wire electrode, in combination with a control circuit comprising wire feed circuit for actuating said wire feed means, a circuit for energizing a welding arc between said wire electrode and work to be welded, a lock-out circuit provided with means for automatically deenergizing said wire feed circuit and welding arc circuit in the absence of a welding arc, and an alarm circuit provided with means for indicating such absence of a welding arc.

8. A gas shielded arc system for a torch; said torch including wire feed means for passing a consumable wire electrode from a source of such wire through said torch and means for discharging arc shielding gas around the end of such wire electrode, in combination with a control circuit comprising wire feed circuit for actuating said wire feed means, a circuit for energizing an arc between said wire electrode and work to be welded, a lock-out circuit provided with means for automatically deenergizing said wire feed circuit and arc circuit in the absence of an arc, said lock-out circuit including a first relay means responsive to the flow of arc current between said wire electrode and said workpiece; a second relay means activated by said first relay means when there is an absence of arc current; a lock-out relay functioning in response to said second relay means to automatically deenergize said wire feed circuit and said arc circuit.

9. A gas shielded arc welding system for a welding torch; said torch having associated therewith wire feed means for passing a consumable wire electrode from a source of such wire through said welding torch and means for discharging arc shielding gas around the end of such wire electrode, in combination with a wire feed circuit for actuating said wire feed means, a circuit for energizing a welding arc between said wire electrode and work to be welded, a lock-out circuit provided with means for automatically deenergizing said wire feed circuit said lock-out circuit including a first relay means responsive to the flow of arc current between said wire electrode and said workpiece; a second relay means activated by said first relay means when there is an absence of arc current; a lock-out relay functioning in response to said second relay means to automatically deenergize said wire feed circuit, and an alarm circuit provided with means for indicating the absence of a welding arc.

10. An arc system comprising a torch, wire feed means for passing a consumable wire electrode from a source of such wire through said torch and a control circuit comprising a wire feed circuit provided with a switch for actuating said wire feed means, an arc energizing circuit for energizing an arc between said wire electrode and a workpiece, an alarm circuit provided with alarm means for indicating the absence of such arc and a lock-out circuit including relay means being effectuated by the absence of such arc to open said wire feed circuit and said arc energizing circuit thereby stopping the feed of said consumable wire electrode and deenergizing such arc energizing circuit and to close said alarm circuit thereby actuating said alarm means to indicate the absence of such arc.

References Cited in the file of this patent
UNITED STATES PATENTS

| | | |
|---|---|---|
| 1,536,774 | Clarkson | May 5, 1925 |
| 2,027,224 | David | Jan. 7, 1936 |
| 2,031,288 | Tripp | Feb. 18, 1936 |
| 2,192,555 | Morelisse | Mar. 5, 1940 |
| 2,808,499 | Anderson | Oct. 1, 1957 |
| 2,843,727 | Benz et al. | July 15, 1958 |